United States Patent
Fouladgar et al.

(10) Patent No.: US 9,369,490 B2
(45) Date of Patent: Jun. 14, 2016

(54) METHOD FOR THE SECURE EXCHANGE OF DATA OVER AN AD-HOC NETWORK IMPLEMENTING AN XCAST BROADCASTING SERVICE AND ASSOCIATED NODE

(71) Applicant: THALES, Neuilly sur Seine (FR)

(72) Inventors: Sepideh Fouladgar, Gennevilliers (FR); Patrick Duputz, Gennevilliers (FR)

(73) Assignee: THALES, Neuilly sur Siene (FR)

( * ) Notice: Subject to any disclaimer, the term of this patent is extended or adjusted under 35 U.S.C. 154(b) by 0 days.

(21) Appl. No.: 14/340,347

(22) Filed: Jul. 24, 2014

(65) Prior Publication Data

US 2015/0033010 A1    Jan. 29, 2015

(30) Foreign Application Priority Data

Jul. 25, 2013  (FR) ...................................... 13 01788

(51) Int. Cl.
  *H04L 29/06* (2006.01)
  *H04L 9/14* (2006.01)
  *H04W 40/02* (2009.01)
  *H04W 84/18* (2009.01)

(52) U.S. Cl.
  CPC ...... *H04L 63/20* (2013.01); *H04L 9/14* (2013.01); *H04L 63/0464* (2013.01); *H04W 40/02* (2013.01); *H04L 63/06* (2013.01); *H04L 2209/601* (2013.01); *H04W 84/18* (2013.01)

(58) Field of Classification Search
  CPC .......... H04L 9/006; H04L 63/00; G06F 21/00
  USPC .......... 370/255, 277, 389, 241, 310; 713/168, 713/160, 162, 169, 166; 380/277
  See application file for complete search history.

(56) References Cited

U.S. PATENT DOCUMENTS

| 6,782,475 | B1 * | 8/2004 | Sumner | H04L 12/18 380/255 |
| 7,349,430 | B1 * | 3/2008 | Chapman | H04L 12/2801 370/390 |
| 7,646,713 | B1 * | 1/2010 | Absillis | H04L 12/2878 370/230.1 |
| 7,656,890 | B2 * | 2/2010 | Chapman | H04L 12/2801 370/431 |

(Continued)

OTHER PUBLICATIONS

Search Report and Written Opinion dated Jun. 4, 2014 for French Patent Application No. 1301788 filed Jul. 25, 2013.

(Continued)

*Primary Examiner* — Dede Zecher
*Assistant Examiner* — Viral Lakhia
(74) *Attorney, Agent, or Firm* — Knobbe, Martens, Olson & Bear, LLP (57) ABSTRACT

A method for the secure exchange of data over an ad-hoc network implementing an Xcast broadcasting service and an associated node are disclosed. The method includes providing a security graph for the network and a communication graph for the network, routing a data item between the sender node sending the data and each receiver node receiving the data along a secure route on the security graph. The method also includes generating, between one relay node and a subsequent relay node of the secure route, an appropriate message, containing the data protected in accordance with a security association shared between the relay node and the subsequent relay node. The method further includes routing the message from the relay node to the subsequent relay node along a communication route on the communication graph.

11 Claims, 3 Drawing Sheets

(56) References Cited

U.S. PATENT DOCUMENTS

| | | | | | |
|---|---|---|---|---|---|
| 7,672,230 | B2* | 3/2010 | Chapman | H04L 12/2801 | 370/225 |
| 7,944,854 | B2* | 5/2011 | Akhter | H04L 41/0803 | 370/254 |
| 7,962,652 | B2* | 6/2011 | Jong | H04L 29/12009 | 709/225 |
| 8,041,335 | B2* | 10/2011 | Khetawat | H04L 63/104 | 455/404.1 |
| 8,108,548 | B2* | 1/2012 | Teodosiu | H04L 67/104 | 709/229 |
| 8,335,316 | B2* | 12/2012 | Hirth | H04L 9/12 | 380/256 |
| 8,352,729 | B2* | 1/2013 | Manning | H04L 63/105 | 713/153 |
| 8,762,722 | B2* | 6/2014 | Roeder | H04L 63/061 | 380/278 |
| 8,788,805 | B2* | 7/2014 | Herne | H04L 63/0428 | 713/153 |
| 8,881,288 | B1* | 11/2014 | Levy | G06F 21/577 | 709/225 |
| 8,983,071 | B2* | 3/2015 | Han | H04L 63/061 | 370/254 |
| 9,077,772 | B2* | 7/2015 | Hui | H04L 67/12 | |
| 9,124,636 | B1* | 9/2015 | Rathor | H04L 63/20 | |
| 2004/0025018 | A1* | 2/2004 | Haas | H04L 45/26 | 713/168 |
| 2005/0060562 | A1* | 3/2005 | Bhattacharya | H04L 63/1416 | 726/26 |
| 2005/0102504 | A1* | 5/2005 | Le | H04L 63/029 | 713/160 |
| 2007/0153739 | A1* | 7/2007 | Zheng | H04W 12/08 | 709/229 |
| 2008/0205312 | A1* | 8/2008 | Metke | H04W 40/28 | 370/310 |
| 2009/0059924 | A1* | 3/2009 | Muramoto | H04L 12/1836 | 370/390 |
| 2009/0220080 | A1* | 9/2009 | Herne | H04L 63/0428 | 380/255 |
| 2010/0023752 | A1* | 1/2010 | Barker | H04L 63/065 | 713/153 |
| 2010/0115272 | A1* | 5/2010 | Batta | H04L 45/00 | 713/162 |
| 2010/0303072 | A1* | 12/2010 | Jokela | H04L 12/185 | 370/390 |
| 2011/0066851 | A1* | 3/2011 | Bello | H04L 45/42 | 713/166 |
| 2011/0216656 | A1* | 9/2011 | Pratt, Jr. | H04L 12/66 | 370/241 |
| 2012/0051275 | A1* | 3/2012 | Alex | H04W 36/0055 | 370/312 |
| 2012/0087368 | A1* | 4/2012 | Kunarathnam | H04L 45/308 | 370/389 |
| 2013/0101291 | A1* | 4/2013 | Wittenschlaeger | H04L 45/02 | 398/58 |
| 2014/0281530 | A1* | 9/2014 | Song | H04L 63/123 | 713/168 |

OTHER PUBLICATIONS

Han et al., Multi-Path Security-Aware Routing Protocol Mechanism for Ad Hoc Network, International Conference on Hybrid Information Technology (ICHIT '06), IEEE, Piscataway, NJ, USA, Nov. 9, 2006.

Yi et al., Security-Aware Ad hoc Routing for Wireless Networks, Annual Workshop on Mobile and Ad Hoc Networking and Computing (MOBIHOC), Oct. 1, 2001.

Du et al., Two Tier Secure Routing Protocol for Heterogeneous Sensor Networks, IEEE Transaction on Wireless Communications, vol. 6, No. 9, IEEE, Piscataway, NJ, USA, Sep. 2007.

Gossain et al., A Scalable Explicit Multicast Protocol for MANETs, Journal of Communications and Networks, vol. 7, No. 3, IEEE, New York, NY, USA, Sep. 2005.

Shashikala et al., A Survey on Secured Routing Protocols for Wireless Sensor Network, IEEE 3rd International Conference on Computing Communication & Networking Technologies (ICCCNT), Coimbatore, India, Jul. 2012.

* cited by examiner

METHOD FOR THE SECURE EXCHANGE OF DATA OVER AN AD-HOC NETWORK IMPLEMENTING AN XCAST BROADCASTING SERVICE AND ASSOCIATED NODE

CROSS-REFERENCE TO RELATED APPLICATIONS

This application claims benefit under 35 U.S.C. §119 of French Application No. 13 01788, filed Jul. 25, 2013, which is herein incorporated by reference in its entirety.

BACKGROUND OF THE INVENTION

1. Field of the Invention

The described technology relates to the field of security of ad-hoc networks.

2. Description of the Related Art

Throughout this present document, the term "secure routing" shall be understood to refer to a routing between a sender and a receiver of a data item while ensuring the protection of this data item exchanged in terms of confidentiality and integrity thereof.

The secure routing of data between a sender and a receiver implies that the sender and receiver share a security association, hereinafter referred to as SA (as per the English acronym for "Security Association"). An SA consists of cryptographic algorithms and keys necessary for the protection of the data exchanged.

The described technology relates more particularly to ad-hoc networks implementing a data broadcasting service of the type based on 1 sender to N receivers, as opposed to a so called "unicast" service based on 1 sender to 1 receiver.

Amongst the "1 sender to N receivers" type broadcasting services, the so called "multicast" broadcasting services are a known modality, in which the sender addresses a group of receivers. Over the course of operation of the network, the nodes of the network subscribe to or unsubscribe from the various receiver groups.

SUMMARY OF CERTAIN INVENTIVE ASPECTS

Amongst the "1 sender to N receivers" type broadcasting services, the so called "Xcast" broadcasting services are also a known modality, in which the sender explicitly addresses a list of receivers. As compared to a multicast service, an Xcast Service presents the advantage of not having to implement a mechanism that provides the ability to maintain in an updated state the table of nodes registered in the various different recipient groups present on the network.

Thus, certain embodiments are more particularly related to ad-hoc networks implementing a mode of broadcasting of the Xcast type.

Operating the Xcast broadcasting mode makes it possible to optimize the performance of an ad hoc network, and in particular to optimize the bandwidth of an ad-hoc radio network.

However, the lack of a centralized management system and the plurality of receivers in the Xcast broadcasting mode adds significant complexity to the mechanisms of generation and distribution of security associations, and the corresponding cryptographic keys.

The securing of the Xcast broadcasting mode constitutes a considerably challenging issue both from the point of view of the performance aspects as well as the security of private-, government-, and/or defense services ad-hoc radio networks.

All the security enabling methods known to date tend to degrade the performance (bandwidth for the user traffic and availability of the network) and the level of security (confidentiality of user data). These other security enabling methods with comparable performance degrade the security, while those with comparable security degrade the performance.

For example, the protection of sensitive or classified user data in the Xcast mode may be obtained by the encryption of this data with a key shared by all of the nodes in the network. This method provides a simplified mechanism for management of Xcast protection keys. However, it does not provide the ability to cryptographically partition the user communications within the network. Under these conditions, the compromising of one node of the network (loss or theft) results in the compromising of all the communications in Xcast mode over the network and requires the renewal of all keys of all the network nodes.

By way of another example, the protection of sensitive or classified user data in the Xcast mode may be obtained in the following manner: the data is transmitted encrypted by means of an Xcast encryption key, which itself is transmitted encrypted by means of keys that the sender shares with each of the N receivers. This method offers a theoretical capacity to cryptographically partition the user communications within the network. However, it leads to a complex key management system involving dissemination to all of the nodes, of the Xcast protection keys. The compromising of one node of the network results in the compromising of all the communications in Xcast mode within the network and requires the renewal of the Xcast keys over all of the nodes in the network. This method also results in a very significant increase in size of the header of the data messages broadcast in Xcast mode. Indeed, the header portion of the message contains, for each of the N receivers, the Xcast encryption key, encrypted by means of the key shared between the sender and the receiver considered.

In a more general manner, there are security enabling processes that are based either on the hypothesis of there being a planning of all of the exchanges of messages between senders and receivers, and therefore a pre-configuration of security associations used for the protection of data exchanged, or the implementation of protocols for negotiation of an SA and keys within a group consisting of the sender and receivers. This latter mechanism of negotiating an SA amongst multiple communicating parties is tedious and is only acceptable in the event that the structural makeup of the group changes little over the course of time and operation of the network, which is rarely the case in ad-hoc networks, and particularly in radio networks.

In conclusion, where mechanisms for securing data are known for unicast and multicast broadcasting modes, to date no effective mechanism exists for securing of data for the Xcast broadcasting mode.

Certain embodiments thus aim to overcome this problem.

In order to accomplish this, an object of certain embodiments relates to a method implemented in an ad hoc network implementing an Xcast broadcasting service for the secure exchange of a data item from a sender node sending the data to a list of receiver nodes receiving the data, a communication topology of the network being defined by a communication graph, wherein it comprises the steps of: providing a security graph for the network that defines a security topology for the network, routing, on the basis of the security graph, the data between the sender node sending the data and each receiver node receiving the data along a secure route on the security graph; generating, between one relay node and a subsequent relay node of the secure route, an appropriate message, containing the data protected in accordance with a security association shared between the relay node and the subsequent relay node; and routing, on the basis of the communication graph, the message from the relay node to the subsequent relay node along a communication route on the communication graph.

According to particular embodiments, the method includes one or more the following characteristic features, taken into consideration individually or in accordance with any technically possible combination: the security graph comprises: a plurality of nodes, each node of the security graph corresponding to a single node in the communication graph; a plurality of security associations, one security association grouping together multiple nodes sharing the same given set of keys and encryption algorithms; and, a plurality of trusted nodes, each trusted node sharing at least one upstream security association with at least one upstream node and at least one downstream security association with at least one downstream node, and being capable of performing an operation of trans-encryption of a data item protected in accordance with the upstream security association into a data item protected in accordance with the downstream security association; the data is relayed along the secure route by a trusted node; in the step of message generation, the generated message is in compliance with the following protocol: a header portion of the message contains: the identifier of the sender of the message; the identifier of the sender of the data; the identifier of each receiver of the message; and, for each identifier of the message receiver, the list of receivers of the data that are accessible via the receiver of the message; a payload portion of the message containing the data protected in accordance with the security association shared between the sender of the message and the or each receiver of the message; the method includes an initial configuration step of configuring the trusted nodes, intended to define the or each trans-encryption between an upstream security association and a downstream security association that each trusted node is authorized to perform; in the step of routing on the basis of the security graph, for each receiver of the data, the best secure route is selected based on one or more of the following criteria: minimization of the number of trans-encryptions performed by the trusted nodes; minimization of the number of hops on the communication graph; and/or maximization of a variable value corresponding to the quality of service associated with the route followed on the communication graph.

The dissemination of a data item to a receiver is blocked when there is no secure route available to enable the sender of the data to connect with the receiver of the data on the security graph.

Another object of certain embodiments also relates to a node of an ad hoc network implementing an Xcast broadcasting service, the node comprising a communication topology for the network defined by a communication graph, wherein it includes, in addition, a security graph for the network defining a security topology for the network, and in that it is capable of implementing a method in conformity with the previous method for the secure broadcasting of a data item generated by a sender of the data, to one or more receivers of the data.

Another object of certain embodiments also relates to an ad hoc network implementing an Xcast broadcasting service, wherein it comprises a plurality of nodes, each node being in conformity with the preceding node.

For example, the network includes at least one cluster of nodes each provided respectively with a radio communication unit, in a manner so as to form there between a radio transmission network.

BRIEF DESCRIPTION OF THE DRAWINGS

The described technology and its advantages will be better understood upon reviewing the description that follows, provided purely by way of illustration and without limitation thereof, of an exemplary embodiment, with reference being made to the accompanying drawings in which.

DETAILED DESCRIPTION OF CERTAIN ILLUSTRATIVE EMBODIMENTS

Figure 1:
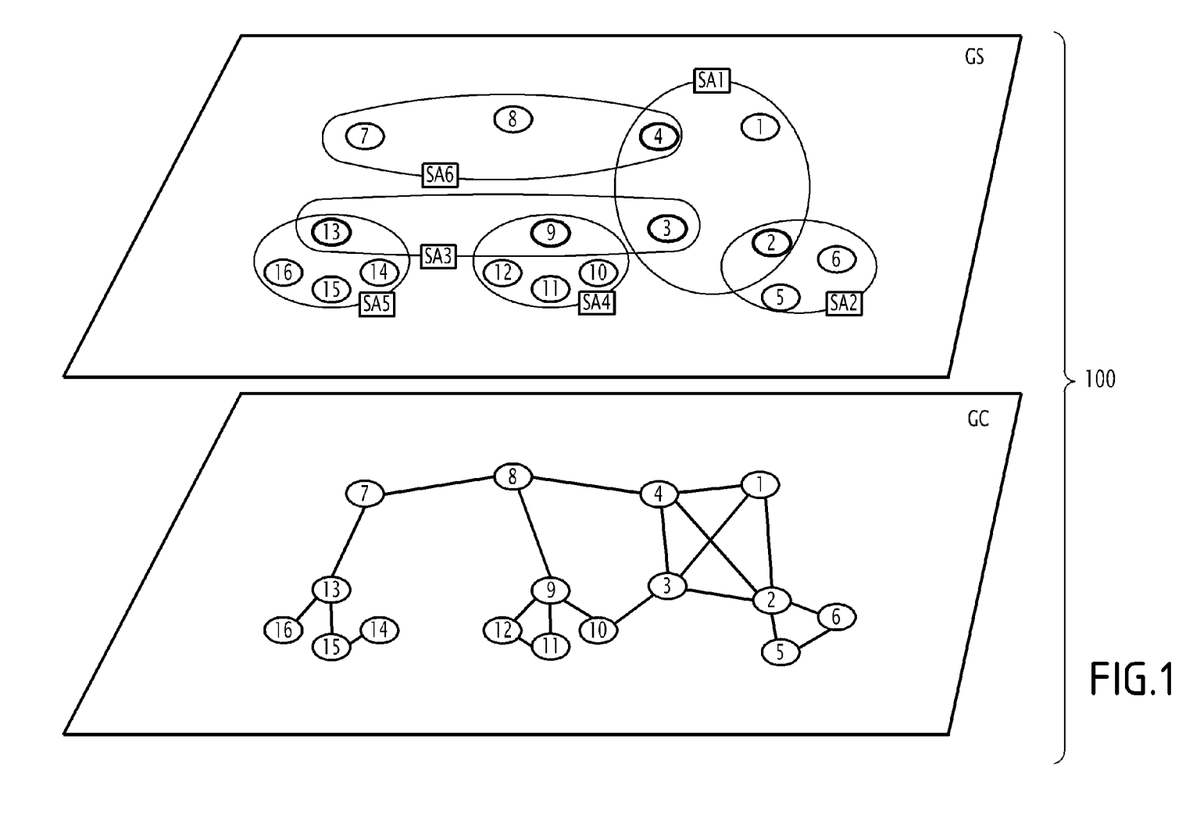
FIG. 1 is a representation of a security topology chart overlaid on top of a transmission topology chart for an ad-hoc radio network.

FIG. 1 represents a network 100.

The network 100 is an ad-hoc radio network implementing an Xcast broadcasting service.

The network 100 has M nodes. In FIG. 1, the network 100 includes 16 nodes.

Each node constitutes, for an associated application, an access point for accessing the network 100.

In particular, the node 3 constitutes an access point for a network administration application network for administering the network 100.

At the level of a communication layer, the network 100 is described by way of a communication topology, which is defined by a communication graph GC.

The chart GC includes M nodes connected by p links.

A link between two nodes of the chart GC corresponds to the establishment of a bidirectional radio communication link between these two nodes.

Depending upon the characteristic features of each link (communication protocol implemented, wired connection or radio link, frequency used, etc), the network 100 may be sub divided into a plurality of transmission networks. For the purposes of clarity, in FIG. 1, the network 100 is shown as consisting of a single radio transmission system.

In order to enable the implementation of a secure routing method, the network 100 is also described, at the level of a security layer, by way of a security topology. This latter is used overlaid on top of the communication topology.

The security topology is entirely defined by a security graph GS.

The security graph GS of the network 100 includes M nodes and q security associations.

Each node of the security graph GS corresponds to one and only one node in the communication graph GC. They are identified by the same identifying reference numerals on both the charts.

A link between two nodes in the security graph GS corresponds to the establishment of a security association between these two nodes. Two nodes are said to be within line of sight if they share a security association.

Thus, each node in the security graph GS shares with one or more other nodes a security association SAi. A security domain is established amongst a plurality of nodes, where a common security association exists amongst these nodes. In the security graph GS, a bubble is drawn around the nodes that share a same given security association SAi, that is to say the nodes of the same security domain.

The security graph GS includes trusted nodes selected from the cluster of nodes that belong simultaneously to multiple security domains. Each trusted node is associated with a security policy that either does or does not authorize the trans-encryption of a data item with an upstream security association, to a downstream security association. A trusted node thus allows for the trans-encryption of a data item without the risk of compromise, from an upstream security association, to a downstream security association. A trusted node thus allows for the passage of a data item from an upstream security domain to a downstream security domain.

In the security graph GS shown in FIG. 1, a trusted node is encircled by a thick line in contrast to the other nodes in the network.

A secure route is established in the security graph GS, when a sender node may transmit a data item to a list of receiver nodes, by possibly passing through one or more relay nodes, in a manner such that this data item is at all times protected by a security association.

The security associations, the list of trusted nodes as well as the trans-encryptions that they are authorized to perform are, for example, configured in an earlier phase prior to the operation of the network 100.

Each node is a computer that includes a computing unit, such as a processor, a data storage unit such as a read only memory (ROM) and a read/write memory (RAM), and at least one communication unit, which in the embodiment described is of the radio type, which enables the exchange of data packets on the communication layer of the network 100, in accordance with a predetermined protocol, an example of a possible type being Internet Protocol (IP). A node is for example a network card that executes the instructions of a suitable driver software.

Each node includes: a security module, comprising of a security routing algorithm, adapted so as to develop a message based on the data to be exchanged and while taking into account the security topology of the network 100; and a routing module comprising of a communication routing algorithm adapted so as to develop a packet from a message and while taking into account the communication topology of the network 100.

Thus, each node in the network stores a copy of the communication graph GC and a copy of the security graph GS. In other words, the communication graph and security graph are identical from one node to another in the network 100. Thus, at any moment in time, each node in the network has a complete view of the communication topology and the security topology.

Each node selected as a trusted node includes in addition a trans-encryption module.

Over the course of an initial configuration phase for configuring the network 100, the security graph GS defining the security domains, the trusted nodes, as well as the trans-encryptions authorized on each trusted node, are configured on each node n of the network 100.

The nodes selected as trusted nodes consequently come to be assigned the keys associated with the security domains that they connect. A security policy configured on each trusted node defines the trans-encryptions authorized between an upstream secure domain and a downstream secure domain of the trusted node. A trusted node comes to have its trans-encryption capability enabled when it is in possession of the security policy defining the authorized trans-encryptions as well as the keys for the upstream and downstream security domains that it connects.

In the operation phase, the communication graph GC may come to be changed. The synchronization of the determination of the state of the communication graph GC between the various different nodes of the network 100 is performed by using a known method, such as a method using an ad-hoc routing protocol, outside the scope of this present document.

The security graph GS may also be modified during the operation phase. This reconfiguration of the security graph GS may be carried out by means of the application for administration and dissemination of configuration messages to the various different nodes of the network 100, and this may be done each time that it becomes necessary to update the security graph GS, for example when a node of the network is corrupted. The new configuration of the security graph GS may be uploaded onto the different nodes and become effective on all of these nodes as of a coordinated instant of time, the different nodes being synchronized with each other.

Thus, at each instant in the operation of the network, each node possesses the same vision of the communication topology and the security topology of the network 100.

The process implemented at the level of the security layer, and then at the level of the underlying communication layer, by each node, ensures the ability to transmit a data item in a secure manner from a sender of the data, to each of the receivers of the data, who belong on a list of recipients.

During the execution of the security module of a relay node, the security graph GS is used to define a secure route on the security graph that enables the security routing of the data, from the relay node to the receiver of the data. A data message is then developed in order to transmit the protected data from the relay node to the relay node, following along the secure route defined. The security module develops a message of which the payload portion consists of the data item protected with the security association shared by the relay node and the subsequent relay node. This message is passed to the routing module of the relay node.

During the execution of the routing module of the relay node, the communication graph GC is used to define a communication route on the communication graph that enables the communication routing of the message from the relay node sending the message to the subsequent relay node, which is the receiver of the message. A packet is then prepared by encapsulating the message and sending it to the subsequent relay node. The packet is transmitted from the relay node to the subsequent relay node on the communication layer of the network 100, while possibly being relayed through intermediate nodes acting as a simple router of the packet.

Step by step, the data is routed from the sender node sending the data to the receiver node receiving the data.

Figure 2:
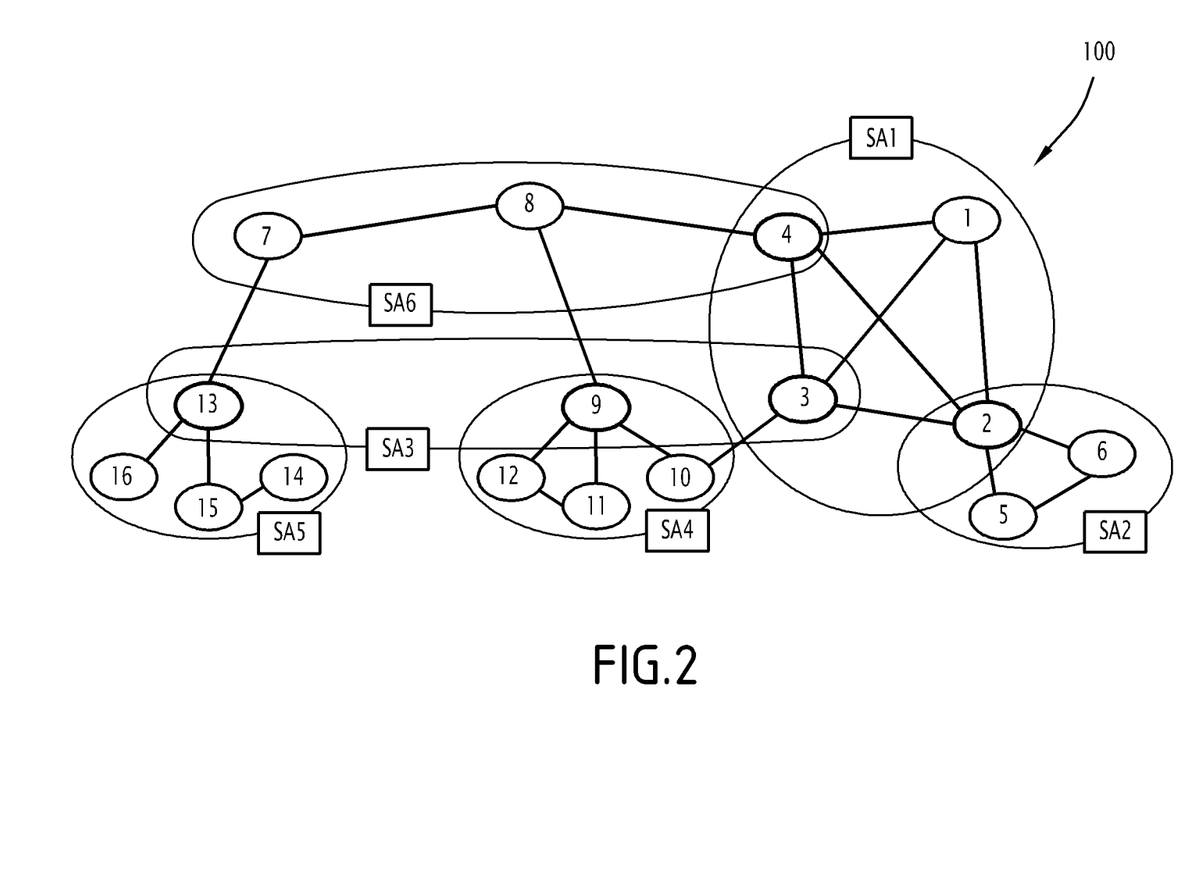
FIG. 2 is a block diagram representing an example of an exchange of data in the network shown in FIG. 1.
Figure 3:
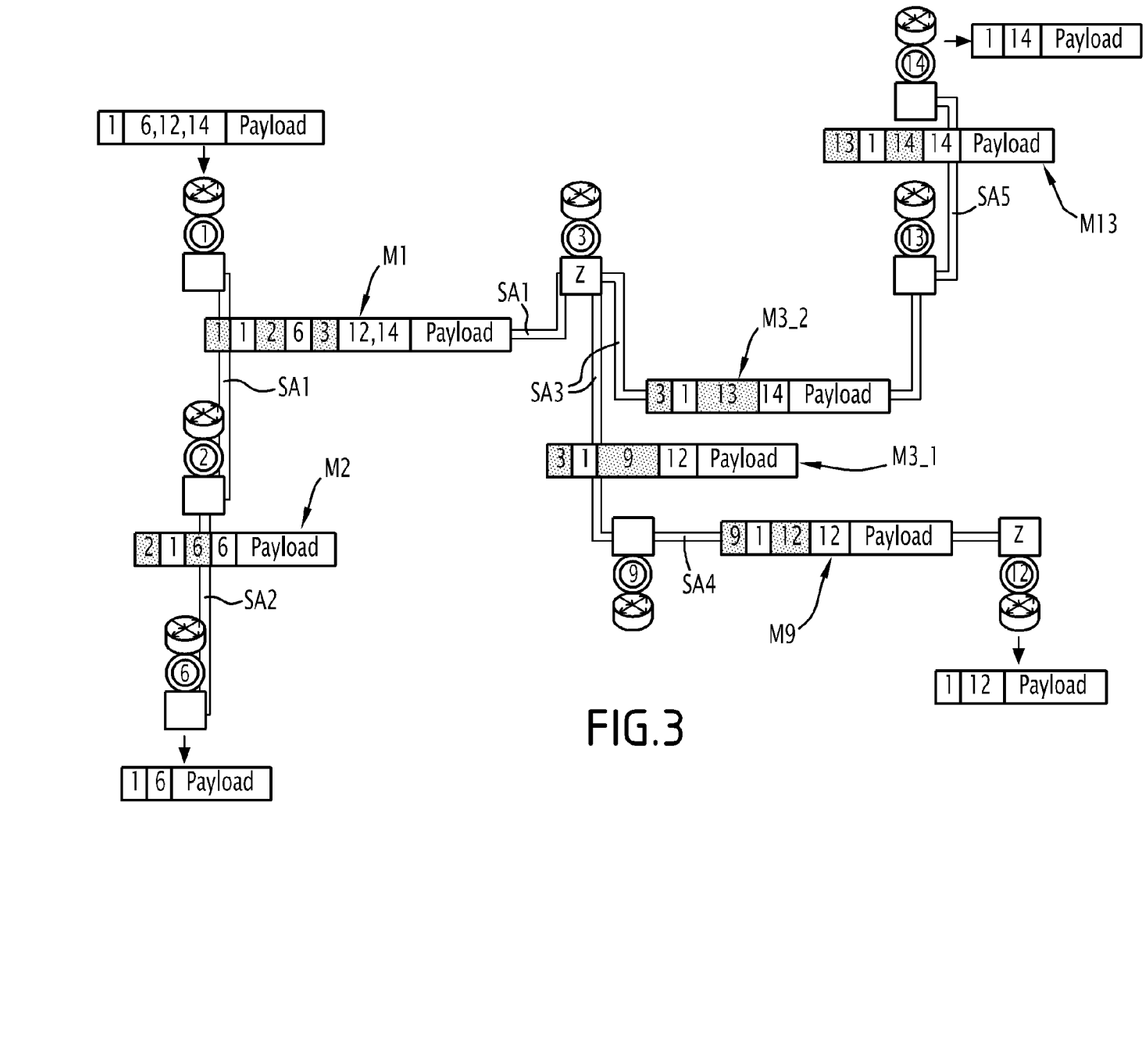
FIG. 3 shows the messages in the security layer for the data exchanges represented in FIG. 2.

In a more detailed manner, and with reference to FIGS. 2 and 3, a sender node E, the sender of a data item, would like to broadcast in Xcast mode, a data item Payload to a list L of recipient nodes, the receivers of the data item Dj.

For example, the node 1, functioning as a sender node wishes to securely broadcast a data item to a list L consisting of receiver nodes 6, 12 and 14.

For each receiver Dj on the list L, the security module of the sender E is executed in order to search, in the security graph GS, for the most secure route from E to Dj.

The criteria for the selection of the most secure route are for example the following: the next hop on the security graph GS must lead to the node that is the receiver of the data Dj; failing that, the next hop on the security graph GS should lead to a trusted node used as relay node Ri for the data item; if multiple trusted nodes are available in a hop, the one chosen is the trusted node that corresponds to the secure route having the minimum number of trans-encryptions from among the different secure routes from the sender E to the receiver Dj.

Possibly, this choice of a relay node is weighted by the information items received from the communication layer of the network ("cross-layering"). Thus to every possible secure route from the sender E to the receiver Dj is assigned a weight that is a function of the number of hops of the communication route in the underlying communication graph. Possibly, this weight is also a function of the value of a variable relative to the quality of service (QoS) induced by the choice of this secure route and the corresponding underlying communication route.

Thus, if the sender E of the data shares a security association with the receiver Dj of the data, the first hop of the most secure route makes it possible to directly reach the receiver Dj of the data.

Conversely, if the sender E of the data does not share a security association with the receiver Dj of the data, then the first hop of the secure route enables the relaying of the data to a trusted node and the passage of this data into another security domain. The receiver node for the data Dj is reached by passing from domain to domain.

In the example shown in FIG. 2, the sender 1 can thus reach the receiver 6 via the secure route passing through the trusted node 2. The first hop of this secure route is the hop to the relay node 2 by using the security association SA1.

The sender 1 can reach the receiver 12 via the secure route passing through the trusted nodes 3 and 9. The first hop of this secure route is the hop to the relay node 3 by using the security association SA1.

The sender 1 can reach the receiver 14 via a secure route passing through the trusted nodes 3 and 13. The first hop of this secure route is the hop to the relay node 3 by using the security association SA1.

Then the sender E generates an equivalent number of data messages as that of security association SAi corresponding to the first hops of the most secure routes to the various different receivers Dj on the list L.

Thus, the first hops of the three most secure routes of the node 1 to the nodes 6, 12 and 14 share the same security association SA1. Consequently the sender 1 thus generates a message M1.

In a general manner, the security module of a node that is the sender of a message (node that is the sender E of the data or relay Ri for the data) is capable of generating a message M to be forwarded to a receiver node receiving the message (node that is the receiver of the data D or subsequent relay Ri+1 for the data) in accordance with a predetermined protocol.

This protocol also provides that the payload portion of the message M contains the data secured in accordance with the keys and algorithms of a security association. This security association is the one that is shared between the sender of the message and the receiver of the message.

This protocol also provides that the header portion of the message M contains: the identifier of the sender of the message, E or Ri; the identifier of the sender of the data E; the identifier of each receiver of the message Ri+1 or Dj (the various different receivers of the message share with the sender of the message the security association used to protect the data) and, for each receiver of the message, the list of receivers of the data Dj that are accessible via the receiver of the message. In addition, the header may include an identifier of the security association with which the data is protected.

Thus, the message M1 developed by the node 1 includes a payload corresponding to the data item protected in accordance with the security association SA1 and a header portion comprising: 1 for the identifier of the sender of the message M1; 1 for the identifier of the sender of the data item Payload; 2 for the identifier of the receiver of the message and, associated with this identifier, the list of identifiers of receivers of the data accessible via the node 2, that is the node 6; and 3 for the identifier of the receiver of the message and, associated with this identifier, the list of identifiers of receivers of the data accessible via the node 3, that is the nodes 12 and 14.

The message M is subsequently passed on to the routing module of the sender E in order for the latter to route it properly on the communication layer, to the receiver nodes receiving the message.

For example, the routing module of the node 1, routes the message M1 to the recipients mentioned in the header portion of M1, that is, the nodes 2 and 3.

Since a link exists between the nodes 1 and 2, the message M1 is routed in one hop on the communication graph to the node 2. In a similar manner, since a link exists between the nodes 1 and 3, the message M1 is routed in one hop to the node 3.

When a node Ri receives the message M, if the node Ri is not the receiver of the message M, this means that the node Ri is an intermediate node in the communication routing of the message on the communication graph GC between a sender of the message and a receiver of the message. The routing module of the node Ri then routes the message M on the network 100 to the receiver node receiving the message in accordance with the communication graph GC.

If the node Ri is the receiver of the message M, its communication routing module transmits the message M to its security module, which is then executed.

The security module of the node Ri reads the list of receivers of the data Dj associated with the identifier of the node Ri.

If the identifier of the node Ri does not appear in this list, it means that the node Ri is not the receiver of the data, but a relay node on the secure route.

The security module of the node Ri identifies the security association with which the data is protected via a specific identifier contained in the header of the message M, such as for example the field "Security Parameter Index" of the IPsec (Internet Protocol Security) standard. It checks the integrity of the data received and rejects it in the absence of data integrity. The security association shared between the sender of the message and the node Ri is an upstream security association for the node Ri.

The security module of the node Ri determines, as described here above, the most secure route to each of the receivers of the data Dj that are associated with it. The security associations to be used for the first hops of the most secure routes are determined. For the node Ri, each of these security associations is a downstream association.

For each security association thus determined, the security module of the node Ri verifies that it is authorized to trans-encrypt the data of the upstream security association, to the downstream security association. It then constructs a message M' of which the payload portion contains the data protected in accordance with the downstream security association. The header portion of the message M' indicates the identifier of the sender of the message, Ri; the identifier of the sender of the data E; the identifier of each receiver of the message Ri+1 or Dj and, for each receiver of the message, the list of receivers of the data Dj that it provides the ability to reach; as well as possibly an identifier of the security association used.

Thus, the node 2, receiver of the message M1, notes that it is only acting as a relay node for relaying the data forwarded to the node 6.

It identifies that the data is protected in accordance with the security association SA1 based on the security association identifier indicated in the header of M1.

The node 2 in its turn searches in the security graph GS, for the best route to the receiver node 6. The node 6 belongs to the downstream domain of the node 2, the domain defined by the security association SA2.

The node 2 having the corresponding authorization, it trans-encrypts the data in the message M1 from SA1 to SA2.

The node 2 generates a message M2 with a header portion that includes: 2 for the identifier of the sender of the message M2; 1 for the identifier the sender of the data item Payload; 6 for the identifier of the receiver of the message and, associated with this identifier, the receiver 6 of the data.

In the same way, the node 3, receiver of the message M1, notes that it is only acting as a relay node for relaying the data forwarded to the nodes 12 and 14.

It identifies that the data is protected in accordance with the security association SA1 based on the security association identifier indicated in the header of M1.

The node 3 searches in the security graph GS, for the best route to the receiver nodes receiving the data 12 and 14.

The node 3 can reach the node 12 via the node 9 provided that there is a new trans-encryption.

The node 3 can reach the node 14 via the node 13.

Each first hop of these two most secure routes occurs in the domain defined by the security association SA3.

The node 3 trans-encrypts the data by protecting it with the keys and algorithms of the secure link SA3.

The node 3 develops a first message M3_1 whose header contains the identifier of the node transmitting the message, here the node 3, and the sender of the data, here node 1, the identifier of the receiver of the message, here the node 9 and the identifier of the receiver of the data, here the node 12.

The node 3 develops a second message M3_2 whose header contains the identifier of the node transmitting the message, here the node 3, and the sender of the data, here node 1, the identifier of the receiver of the message, here the node 13 and the identifier of the receiver of the data, here the node 14.

The node 3 sends two messages.

For the first message M3_1 from the node 3 to the node 9, the communication route passes through the intermediate node 10, which is connected with both the node 3 and the node 9 as indicated by the communication graph GC.

For the second message M3_2 from the node 3 to the node 13, the communication route passes through the intermediate nodes 4, 8 and 7, as indicated by the communication chart GC.

In its turn, the node 9 (respectively 13), receiver of the message M3_1 (M3_2), but not the receiver of the data, must relay the data to the receiver node 12 (14).

It identifies that the data is protected in accordance with the security association SA3 based on the security association identifier indicated in the header of the message M3_1 (M3_2.)

The node 9 (13) searches in the security graph GS, for the best route to the receiver node 12 (14).

The node 9 (13) trans-encrypts the data by protecting it with the keys and algorithms of the secure link SA4 (SA5).

The node 9 (13) generates a message M9 (M13) forwarded to the node 12 (14).

If the node Ri is the receiver of the data, that is to say when its identifier belongs on the list of nodes Dj.

The security module of the node Dj identifies the security association with which the data is protected via the identifier contained in the header of the message M. It checks the integrity of the data received and decrypts it in the event of data integrity being intact.

Thus, the node 12 (14) receives the message M9 (M13) which has been sent to it and decrypts the data which is intended for it with the security algorithms and keys of the security association SA4 (SA5).

The data is thus broadcast from the sender E to a recipient list of explicit receivers Dj, while being at all times protected by a security association. The data is protected each step of the way by means of the algorithms and keys of the secure links existing between the sender and the relay nodes, amongst the relay nodes, and between the relay nodes and receiver nodes.

The dissemination of a data item to a receiver is blocked when there is no secure route available to enable connecting with the receiver from the sender.

The method presented here above thus provides for the secure routing of data forwarded to a list of recipients, free to be changed for each transmission.

In order to route the data in a secure manner to a list of recipients, the method and the system of routing presented here above do not require the negotiation of end to end keys between the various different members of this group. They rely on the existing security associations, and the gateways between these security associations established by the trusted nodes.

The sender and all of the receiver nodes therefore do not need to be within line of sight in order to communicate securely. Although there is no key being shared between a sender and one or more receivers, they nevertheless manage to communicate securely.

The modality used to generate a message is compatible with the objective of reduction of headers by the relay nodes and intermediate nodes all along the routing process (trimming of unnecessary addresses).

Certain embodiments of the method and system of routing presented thus provide the ability to limit the number of necessary security associations within an ad-hoc radio network, and consequently thereby limiting the number of cryptographic keys managed within the network. In effect, in a network where the number of nodes is fairly significant and where the recipients are often different from one transmission to another, if the sender and the receivers are required to share a security association on a mandatory basis, the various different combinations of senders and receivers would require the implementation of an excessively large number of security associations within the network.

Certain embodiments of the present method and the associated system are found to be particularly applicable to ad-hoc radio networks or Ethernet networks that implement the IP protocol.

Certain embodiments of the present method also provide a technical solution to the problem of security related to the risks of loss and theft with respect to the nodes that are most exposed. In fact, they enable the implementation of a strategy that consists of injecting cryptographic keys in the nodes most exposed to the risk of loss and theft that are different from those injected into the other nodes that are located in a controlled environment. Thus, they offer the advantage of ensuring efficient management of the incidence of a node being compromised, by limiting the number of potentially compromised cryptographic keys, as well as the number of key renewals needed in order to restore the security level of the global communication network.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A method, implemented in an ad-hoc network implementing an Xcast broadcasting service for a secure exchange of a data from a sender node, sending the data, to a list of receiver nodes, receiving the data, a communication topology of the network being defined by a communication graph, wherein the method comprises:
   providing a security graph of the network, that defines a security topology for the network;
   routing, on the basis of the security graph, the data between the sender node sending the data and each receiver node receiving the data along a secure route on the security graph, the routing being implemented via the Xcast broadcasting service in which the sender node addresses the list of receiver nodes;
   generating, between a relay node and a subsequent relay node of the secure route, an appropriate message, containing the data protected in accordance with a security association shared between the relay node and the subsequent relay node; and
   routing, on the basis of the communication graph, the message from the relay node to the subsequent relay node along a communication route on the communication graph,
   the security graph comprising:
      a plurality of nodes, each node of the security graph corresponding to a single node of the communication graph;
      a plurality of security associations, each security association of the plurality of security associations grouping together a plurality of nodes sharing a same given set of keys and encryption algorithms; and
      a plurality of trusted nodes, each trusted node of the plurality of trusted nodes sharing at least one upstream security association with at least one upstream node and at least one downstream security association with at least one downstream node, and performing an operation of trans-encryption of a data protected in accordance with the upstream security association into a data protected in accordance with the downstream security association.

2. The method of claim 1, wherein the data is relayed along the secure route by a trusted node.

3. The method of claim 1, wherein, in the generating an appropriate message, the message complies with the following protocol:
   a header portion of the message contains: an identifier of the sender node of the message; an identifier of the sender node of the data; an identifier of each receiver node of the message; and, for each identifier of the receiver node of the message, a list of receiver nodes of the data that are accessible via the receiver node of the message;
   a payload portion of the message containing the data protected in accordance with a security association shared between the sender node of the message and the or each receiver node of the message.

4. The method of claim 1, including an initial configuration for configuring the plurality of trusted nodes, intended to define the or each trans-encryption between an upstream security association and a downstream security association that each trusted node of the plurality of trusted nodes is authorized to perform.

5. The method according to claim 1, wherein, in the routing on the basis of the security graph, for each receiver node of the data, a best secure route is selected based on one or more of the following criteria:
   minimization of the number of trans-encryptions performed by the trusted nodes;
   minimization of the number of hops on the communication graph; and/or
   maximization of a variable value corresponding to the quality of service associated with the route followed on the communication graph.

6. The method according to claim 1, wherein the relay node and the subsequent relay node are trusted nodes.

7. The method according to claim 6, wherein the generating comprises trans-encrypting the data protected in accordance with the upstream security association of the relay node to the downstream security association of the relay node.

8. The method according to claim 1, wherein the communication of a data to a receiver node is blocked when there is no secure route available to enable the sender node of the data to connect with the receiver node of the data on the security graph.

9. A node of an ad-hoc network, implementing an Xcast broadcasting service, comprising a communication topology for the network defined by a communication graph, wherein the node includes, in addition, a security graph of the network defining a security topology for the network,
   wherein the node is configured to implement a method for a secure broadcasting of a data generated by a sender node of the data, to a list of receiver nodes of the data, wherein the node is further configured to:
      provide the security graph of the network;
      route, on the basis of the security graph, the data between the sender node sending the data and each receiver node receiving the data along a secure route on the security graph, the routing being implemented via the Xcast broadcasting service in which the sender node addresses the list of receiver nodes;
      generate, between the node and a subsequent node of the secure route, an appropriate message, containing the data protected in accordance with a security association shared between the node and the subsequent node; and
      route on the basis of the communication graph, the message from the node to the subsequent node along a communication route on the communication graph,
      the security graph comprising:
         a plurality of nodes, each node of the security graph corresponding to a single node of the communication graph;
         a plurality of security associations, each security association of the plurality of security associations grouping together a plurality of nodes sharing a same given set of keys and encryption algorithms; and
         a plurality of trusted nodes, each trusted node of the plurality of trusted nodes being configured to share at least one upstream security association with at least one upstream node and at least one downstream security association with at least one downstream node, and perform an operation of trans-encryption of a data protected in accordance with the upstream security association into a data protected in accordance with the downstream security association.

10. An ad hoc network, implementing an Xcast broadcasting service, comprising a plurality of nodes, each node of the plurality of nodes being a node according to claim 9.

11. The ad hoc network of claim 10, including at least one cluster of nodes, each node of the cluster of nodes being provided with a radio communication unit, in a manner so as to form there between a radio transmission network.

* * * * *